US009962622B2

(12) United States Patent
Hirakawa

(10) Patent No.: US 9,962,622 B2
(45) Date of Patent: May 8, 2018

(54) EVAPORATOR AND FUEL CELL SYSTEM USING THE EVAPORATOR

(71) Applicant: SUMITOMO PRECISION PRODUCTS CO., LTD., Hyogo (JP)

(72) Inventor: Makoto Hirakawa, Amagasaki (JP)

(73) Assignee: SUMITOMO PRECISION PRODUCTS CO., LTD., Hyogo (JP)

( * ) Notice: Subject to any disclaimer, the term of this patent is extended or adjusted under 35 U.S.C. 154(b) by 262 days.

(21) Appl. No.: 14/901,871

(22) PCT Filed: Jul. 1, 2014

(86) PCT No.: PCT/JP2014/067506
§ 371 (c)(1),
(2) Date: Dec. 29, 2015

(87) PCT Pub. No.: WO2015/002182
PCT Pub. Date: Jan. 8, 2015

(65) Prior Publication Data
US 2016/0372772 A1 Dec. 22, 2016

(30) Foreign Application Priority Data
Jul. 1, 2013 (JP) .................................. 2013-138043

(51) Int. Cl.
*B01D 1/06* (2006.01)
*B01D 1/02* (2006.01)
(Continued)

(52) U.S. Cl.
CPC ................ *B01D 1/06* (2013.01); *B01B 1/005* (2013.01); *B01D 1/0011* (2013.01); *B01D 1/02* (2013.01);
(Continued)

(58) Field of Classification Search
CPC .. B01D 1/0011; B01D 1/0058; B01D 1/0064; B01D 1/02; B01D 1/06; B01D 1/30
See application file for complete search history.

(56) References Cited

U.S. PATENT DOCUMENTS

| 2,906,888 A | 9/1959 | Bray et al. | |
| 3,618,660 A * | 11/1971 | Busse | ..................... F28D 15/04 |
| | | | 165/104.14 |
| 2004/0069242 A1 | 4/2004 | Welle | |

FOREIGN PATENT DOCUMENTS

| DE | 10 23 081 B | 1/1958 |
| DE | 10 2005 044660 A1 | 3/2007 |

(Continued)

OTHER PUBLICATIONS

Notification of Transmittal of Translation of the International Preliminary Report on Patentability and Translation of Written Opinion of the International Searching Authority; PCT/JP2014/067506 dated Jan. 14, 2016.

(Continued)

*Primary Examiner* — Renee Robinson
(74) *Attorney, Agent, or Firm* — Studebaker & Brackett PC

(57) ABSTRACT

An object is to provide a highly-efficient evaporator capable of effectively avoiding reduction in steam generation efficiency due to the Leidenfrost phenomenon while maintaining a heating surface in a heating chamber for steam generation in a high-temperature region to be subjected to the influence of the Leidenfrost phenomenon by not reducing heating power required for heating the inside of the heating chamber from outside or not heat-insulating the heating chamber. To achieve this object, a sleeve-like sheet made of foamed nickel is disposed as a foamed member 64 containing metal as a principal component near a heating surface 69 and along an entire periphery of the heating (Continued)

surface 69 in a heating chamber 68 formed inside a pipe body 67 to be heated from the outside in such a manner as to contact the heating surface 69. While water supplied to the inside of the sleeve-like sheet passes through this inside, the water is diffused to permeate the surrounding sleeve-like sheet. Evaporation of the water is finished before the water reaches the heating surface 69.

14 Claims, 5 Drawing Sheets

(51) Int. Cl.
  *B01D 1/30* (2006.01)
  *B01D 1/00* (2006.01)
  *B01J 7/02* (2006.01)
  *C01B 3/38* (2006.01)
  *H01M 8/04119* (2016.01)
  *B01B 1/00* (2006.01)
  *F22B 1/28* (2006.01)
  *H01M 8/0612* (2016.01)

(52) U.S. Cl.
  CPC .......... *B01D 1/30* (2013.01); *B01J 7/02* (2013.01); *C01B 3/38* (2013.01); *F22B 1/282* (2013.01); *H01M 8/04126* (2013.01); *H01M 8/0618* (2013.01); *C01B 2203/0233* (2013.01); *C01B 2203/066* (2013.01); *C01B 2203/1241* (2013.01); *C01B 2203/1294* (2013.01)

(56) References Cited

FOREIGN PATENT DOCUMENTS

| | | |
|---|---|---|
| FR | 1 101 753 A | 10/1955 |
| JP | 01-142390 A | 6/1989 |
| JP | 08-012301 A | 1/1996 |
| JP | 2004-071242 A | 3/2004 |
| JP | 2004-167433 A | 6/2004 |
| JP | 2011-131141 A | 7/2011 |
| SU | 1581337 * | 7/1990 ............... B01D 1/14 |

OTHER PUBLICATIONS

International Search Report—PCT/JP2014/067506 dated Sep. 30, 2014.

* cited by examiner

EVAPORATOR AND FUEL CELL SYSTEM USING THE EVAPORATOR

TECHNICAL FIELD

This invention relates to an evaporator suitable for the generation of steam for reforming raw fuel in a fuel cell system and a fuel cell system using the evaporator.

BACKGROUND ART

Solid oxide fuel cells are one representative of fuel cells. A cell used in these fuel cells generally has a laminated body with a three-layered structure including a thin solid electrolyte layer formed of a sintered body made for example of yttria-stabilized zirconia (YSZ), a fuel electrode stacked on one surface side of the solid electrolyte layer, and an air electrode stacked on an opposite surface side of the solid electrolyte layer. For example, a cermet of Ni and YSZ is used to form the fuel electrode and lanthanum strontium manganite (LSM) is used to form the air electrode. Both of these electrodes are porous sintered bodies.

To run the solid oxide fuel cell, hydrogen-rich reformed gas, obtained by preheating and reforming hydrocarbon-based raw fuel such as natural gas or LPG, is supplied as fuel gas toward the fuel electrode of the cell while preheated air is supplied as oxidized gas toward the air electrode of the cell under a high-temperature condition from 700 to 1000° C. This generates electromotive force between the fuel electrode and the air electrode of the cell. This electromotive force is generated with a low voltage of 1 V or less. Thus, in the case of a cell like a flat plate, multiple cells are stacked in a thickness direction and connected in series to be used as a cell stack.

Regarding a method of the reforming of raw fuel mentioned herein, the following three types are known. The first type is a steam reforming method using an endothermic catalytic reaction to reform hydrocarbon-based raw fuel containing methane (CH4) such as city gas as a principal component to hydrogen-rich reducing gas with steam. The second type is a partial oxidization reforming method using an exothermic catalytic reaction to also reform hydrocarbon-based raw fuel to hydrogen-rich reducing gas by means of partial oxidation with air. The third type is a method using steam reforming and partial oxidation reforming in combination. This method is to produce thermal independence by combining the former endothermic reaction and the latter exothermic reaction. In terms of the power generation efficiency of a fuel cell system, steam-reformed gas generated by the first method is considered to be preferable.

In evaporators generally used for the generation of steam for steam reforming, water is supplied into a heating chamber heated from the outside with radiant heat from a cell stack or heat of combustion of exhaust gas released from the cell stack (unused gas called off-gas), for example, to evaporate the water. One of these evaporators is described in patent literature 1. The evaporator described in patent literature 1 generates steam by supplying water onto an inclined heating surface in a heating chamber heated from the outside with the heat of combustion of exhaust gas released from a cell stack and evaporating the water.

One of the problems in such an evaporator for fuel cells is reduction in steam generation efficiency due to the Leidenfrost phenomenon that occurs for the following reason. Regardless of whether a heat source is the radiant heat from the cell stack or the energy of the exhaust gas from the cell stack, the temperature of the heat source is as high as several hundred degrees C. This places the heating surface in the heating chamber in a temperature from 200 to 300° C. in many cases, by which the Leidenfrost phenomenon occurs. The following explains a problem relating to reduction in steam generation efficiency due to the Leidenfrost phenomenon.

FIG. 5 is a graph showing the behavior of a water droplet on the heating surface. This graph shows a relationship between the temperature of the heating surface and the lifetime of a water droplet on the heating surface. A region of the temperature of the heating surface up to about 110° C. is a non-boiling region where a droplet on the heating surface wets the heating surface and is evaporated. Thus, the lifetime of the droplet is reduced rapidly with an increase in the temperature of the heating surface. A region of the temperature of the heating surface from 110 to 160° C. is a core boiling region where the droplet on the heating surface spreads largely on the heating surface, boils rapidly, and then disappears. The core boiling region is a temperature region of the highest evaporation efficiency.

By contrast, in a region of the temperature of the heating surface from 160 to 300° C., a water droplet on the heating surface is divided into several pieces and these pieces behave in a manner such as to dance on the heating surface. This is the Leidenfrost phenomenon. At this time, the lifetime of the droplet on the heating surface increases with increase in the temperature of the heating surface. At a maximum, this lifetime increases to a degree substantially the same as its lifetime when the temperature of the heating surface is several tens of degrees C. As the temperature of the heating surface is increased to a temperature higher than 300° C., the droplet comes to rest while maintaining its shape as a rotary ellipsoidal body. This is called a spheroidal state where the lifetime of the droplet is reduced with increase in the temperature of the heating surface.

As understood from the above, the evaporator encounters reduction in steam generation efficiency if the temperature of the heating surface is in a temperature region from 200 to 300° C. where the lifetime of a droplet is extended notably by the Leidenfrost phenomenon. In a higher temperature region, the lifetime of the droplet extended once by the Leidenfrost phenomenon is still influential, and steam generation efficiency continues to be low. Thus, in terms of steam generation efficiency, it is important to make sure the temperature of the heating surface does not reach such temperature regions.

However, in terms of a relationship with the temperature of a heat source, avoiding these temperature regions is difficult in an evaporator for fuel cells. Even if these temperature regions can be avoided, the temperature of the heat source becomes too low. This in turns makes the degradation of start-up characteristics unavoidable at the start of running. Similarly, heat insulation of the heating chamber is effective in terms of reducing the temperature of the heating surface, but this also causes deterioration of start-up characteristics at the start of running as it hinders temperature increase of the heating surface at the start of running. In consideration of start-up characteristics at the start of running, the heating surface in the heating chamber should be heated rapidly while the heat source, specifically, atmosphere outside the heating chamber is placed at a high temperature.

The aforementioned reduction in steam generation efficiency due to the Leidenfrost phenomenon is also considered by the evaporator described in patent literature 1. Supplying water onto the inclined heating surface in the heating chamber is intended to be responsive to this reduction. Specifically, if water is supplied onto the inclined heating surface in the heating chamber, the water flows down along the inclined heating surface to suppress the generation of droplets, thereby suppressing the occurrence of the Leidenfrost phenomenon. This evaporator further takes a measure to enhance wettability of a heating surface in a heating container to water on the heating surface by forming fine recesses and projections on this heating surface.

As described above, however, all of these measures require rapid heating of the heating surface to a high temperature and do not allow reduction in the temperature of the heating surface. Thus, these measures cannot be radical solutions.

PRIOR ART LITERATURE

Patent Literature

Patent Literature 1: Japanese Patent Application Publication No. 2011-131141

SUMMARY OF INVENTION

Problem to be Solved by Invention

It is an object of this invention to provide a highly-efficient evaporator capable of effectively avoiding reduction in steam generation efficiency due to the Leidenfrost phenomenon while maintaining a heating surface in a heating chamber for steam generation in a high-temperature region to be subjected to the influence of the Leidenfrost phenomenon by not reducing heating power required for heating the inside of the heating chamber from the outside or not heat-insulating the heating chamber. It is also an object of this invention to provide a fuel cell system that achieves excellent steam generation efficiency, excellent reforming efficiency, and excellent start-up characteristics at the start of running by using the evaporator.

Means of Solving Problem

To achieve the aforementioned object, under the assumption that a heating surface in a heating chamber for steam generation is heated to a high temperature of 200° C. or more by being heated from outside the heating chamber and is not subjected to heat insulation that is to hinder the heating from the outside, the present inventor earnestly conducted a study on a technique capable of radically solving problems relating to the Leidenfrost phenomenon on the heating surface in the heating chamber and reduction in steam generation efficiency due to the Leidenfrost phenomenon. As a result, the present inventor found the effectiveness of disposing a heat-resistant, flexible, and water-absorbing porous body near the heating surface in the heating chamber in such a manner that the porous body contacts the heating surface. The present inventor first paid attention to an aggregate of heat-resistant fibers, particularly, a fabric of alumina long fibers as this heat-resistant, flexible, and water-absorbing porous body.

The present inventor is currently advancing the development of fuel cells while paying attention to the effectiveness of using a spiral pipe as a component of a heating chamber for steam generation in an evaporator for fuel cells. Compared to an annular body having the same outer shape as the spiral pipe, forming the heating chamber using the spiral pipe can increase surface area, thereby increasing heating efficiency in the heating chamber. Further, the spiral pipe can be combined with a unit like a cylinder or a cylindrical column in a concentric pattern. This further increases use efficiency of space in a casing of a fuel cell, thereby contributing to size reduction of the fuel cell in combination with the increased heating efficiency.

Meanwhile, with increase in heating efficiency of the inner surface of the spiral pipe as the heating surface, the Leidenfrost phenomenon is more likely to occur. This places importance on taking measures against the Leidenfrost phenomenon. As one of these measures, the present inventor first attempted to insert a sleeve-like fabric formed of alumina long fibers into the spiral pipe in such a manner that the fabric contacts the inner surface of the pipe.

As a result, the Leidenfrost phenomenon could be prevented effectively on a short-term basis for the following reason. The sleeve-like fabric of alumina long fibers inserted into the pipe is heated effectively with the inner surface of the spiral pipe as the heating surface. Further, while water fed to the inside of the sleeve-like fabric passes through the inside of the fabric, the water is diffused to permeate the surrounding sleeve-like fabric by means of capillary action. As a result, evaporation of the water is finished before the water reaches the inner surface of the spiral pipe, so that the water is not to reach the inner surface of the spiral pipe.

However, on a long-term basis, the aforementioned measure was found to cause a risk of blocking the spiral pipe due to precipitation and deposition of silica ($SiO_2$) contained in the fibers of the fabric with the intention of providing alumina with a fibrous property, flexibility, and a water-absorbing property.

Then, the present inventor paid attention to a foamed metal sheet as a heat-resistant, flexible, and water-absorbing porous body to take the place of the fabric of alumina long fibers. The present inventor folded this sheet into a tubular shape and inserted the sheet into a spiral metal pipe. Then, the present inventor repeated an aptitude test. As a result, the present inventor found that the foamed metal sheet works effectively to substantially the same degree as the fabric of alumina long fibers against the Leidenfrost phenomenon, does not cause the risk of blocking the pipe that becomes an issue in the case of the fabric of alumina long fibers, and can endure long-term use.

The evaporator of this invention has been completed based on the aforementioned knowledge. The evaporator includes: a heating chamber to evaporate water supplied along a heating surface inside the heating chamber by being heated from outside; and a foamed member containing metal as a principal component disposed near the heating surface in the heating chamber in such a manner as to contact the heating surface.

Unlike ceramic such as alumina, metal inherently has elasticity. Therefore, the foamed member containing metal as a principal component exhibits heat resistance, flexibility, and a water-absorbing property in the absence of silica, which brings about an issue in the fabric of alumina long fibers, and does not cause the risk of blocking, etc. due to a precipitate.

In the evaporator of this invention, the foamed member containing metal as a principal component is disposed near the heating surface in the heating chamber in such a manner as to contact the heating surface. Thus, the foamed member is heated efficiently by the heating surface. Because the foamed member is disposed near the heating surface in such a manner as to contact the heating surface, water supplied along the heating surface in the heating chamber does not contact the heating surface directly but flows in a space adjacent to the foamed member to contact the heated foamed member. As a result, before the water reaches the heating surface, the water permeates the foamed member to substantially finish evaporation of the water. Thus, even if the temperature of the heating surface is in a high-temperature region to be subjected to the influence of the Leidenfrost phenomenon, the Leidenfrost phenomenon does not become influential. Specifically, evaporation of the water having permeated the foamed member is substantially finished while the water is diffused in the foamed member toward the heating surface.

A component of the heating chamber may be a container with a shape such as a rectangular tubular shape, a cylindrical shape, or an annular shape, for example With either shape, the heating surface often becomes a flat surface or a curved surface with a gentle curvature. Meanwhile, as described above, a pipe body, in particular, a spiral pipe is desirable in terms of heating efficiency and space efficiency. If the heating chamber includes a pipe body as a component, the inner surface of the pipe body functions as the heating surface. Further, a sleeve-like sheet is disposed as the foamed member near the inner surface of the pipe body along an entire periphery of the inner surface in such a manner as to contact the inner surface. Water is supplied from an upstream-side end portion of the pipe body into a spatial part inside the sleeve-like sheet. While the water is passed through the spatial part and supplied toward a downstream side along the inner surface of the pipe body, the water is diffused to permeate the surrounding sleeve-like sheet. Evaporation of the water is finished before the water reaches the inner surface of the pipe body.

The sleeve-like sheet disposed as the foamed member in the pipe body may be a molded member. Meanwhile, in consideration of economic performance, rounding a flat sheet, press-fitting the rounded sheet into the pipe body, and making the sheet contact the inner surface of the pipe body using resultant spring back force is preferable. At this time, it is desirable that opposite end portions of the sleeve-like sheet rounded and press-fitted into the pipe body in a peripheral direction of the pipe overlap each other to form an overlapping part in terms of eliminating a discontinuity (gap) in the peripheral direction of the pipe. The presence of a discontinuity (gap) between the opposite end portions of the sheet in the peripheral direction of the pipe exposes the inner surface of the pipe body at the discontinuity, causing a risk of the Leidenfrost phenomenon. It is preferable that the overlapping part be disposed parallel to the center line of the pipe body in terms of preventing leakage of water from the overlapping part.

The sleeve-like sheet is disposed so as to extend from the upstream-side end portion of the pipe body from which water is supplied through at least a partial area of a downstream side of the pipe body. The sleeve-like sheet can be disposed to extend from the upstream-side end portion of the pipe body through an entire region of the downstream side. Meanwhile, evaporation of water supplied into the pipe body is generally finished while the water passes through a downstream-side point. Thus, the sleeve-like sheet can be omitted in an area downstream of this point.

An efficient configuration of the evaporator includes a combination of a spiral pipe part and a cylindrical pipe part connected to the spiral pipe part. The spiral pipe part is arranged in a vertical posture to which water is supplied to flow in a top-to-bottom direction. The cylindrical pipe part is arranged in a vertical posture and disposed downstream of and adjacent to the spiral pipe part. In this configuration, steam generated at the spiral pipe part as a steam generator is temporarily stored in the cylindrical pipe part downstream of the spiral pipe part. The generated steam is heated, and pressure change (pulsation) resulting from evaporation of water is absorbed and suppressed in the cylindrical pipe part. As a result, high-temperature steam can be supplied stably to a place requiring the steam. Specifically, the cylindrical pipe part functions as a buffer tank for generated steam. The sleeve-like sheet disposed as the foamed member in the pipe body also achieves a comparable effect of suppressing pulsation.

As described above, using the pipe body as the heating chamber of the evaporator achieves high efficiency. In particular, using the spiral pipe achieves high efficiency in the heating chamber. This highly-efficient spiral pipe is particularly suitable for a compact fuel cell with an output of 1 kW or less, for example. The spiral pipe in the compact fuel cell has a small bend radius. The sleeve-like sheet can still be inserted into this small-radius spiral pipe by inserting the sleeve-like sheet into a straight pipe and bending the straight pipe into the spiral pipe after insertion.

However, reduction in the bend radius of the spiral pipe was confirmed to cause the following. With the reduction in the bend radius, the sleeve-like sheet inserted into the straight pipe is deformed by buckling by the bending into the spiral pipe to be separated partially from the inner surface of the pipe body. This reduces tightness of contact with the inner surface of the pipe body, thereby reducing the effect of preventing the Leidenfrost phenomenon. In particular, if the sleeve-like sheet is formed by simply rounding a flat sheet, the opposite end portions are separated (overlapping part is unfolded) in the peripheral direction of the pipe resulting from the deformation by buckling. In this case, the effect of preventing the Leidenfrost phenomenon is drastically reduced.

Then, the present inventor considered a measure against the Leidenfrost phenomenon to take the place of insertion of the sleeve-like sheet. As a result, the present inventor found that insertion of a chain into the pipe body, particularly into the spiral pipe, is an effective measure. The chain mentioned herein is formed by continuously linking rings such as circular or oval rings, for example. As long as the chain can deflect in all directions from the center line, the chain can be inserted without difficulty into the spiral pipe with a small bend radius.

After this chain is inserted into the pipe body as the heating chamber of the evaporator, water supplied into the pipe body vigorously collides with the chain in the pipe body to generate a notable turbulent flow of the water. Then, the water is scattered into space inside the pipe body of which a large amount is evaporated in the space in the pipe body. In particular, in the case of the spiral pipe, the pipe body is formed into an inclined pipe. Thus, the chain is placed on an inclined floor surface of the inclined pipe. This facilitates generation of a turbulent flow of the water mainly flowing near the floor surface while causing steam to flow smoothly near a ceiling surface. As a result of these effects, the Leidenfrost phenomenon is suppressed in the spiral pipe to substantially the same degree as or a degree higher than insertion of the sleeve-like sheet.

More specifically, in the evaporator including the spiral pipe part, the sleeve-like sheet made of a foamed material containing metal as a principal component exists as it is in a linear pipe part disposed upstream or downstream of the spiral pipe part, arranged in a vertical posture, and extending in a bottom-to-top direction to be connected to an upstream-side end or a downstream-side end of the spiral pipe part. Meanwhile, the sleeve-like sheet is replaced by a heat-resistant chain in the spiral pipe part. This prevents the Leidenfrost phenomenon more effectively and stably in the spiral pipe part.

A material for the chain mentioned herein should be a heat-resistant material that can avoid deterioration by heat caused by heating of the evaporator. This material is typically SUS-based heat-resistant metal, but it may alternatively be non-metal such as ceramic.

The foamed material containing metal as a principal component is a metal-based foamed material, if stated differently. Fuel gas used in fuel cells is hydrogen-rich reducing gas. Thus, favorable reactivity with this reducing gas becomes an important issue relating to the metal mentioned herein. More specifically, this material preferably has characteristics of restoring its original state as metal by being exposed to the reducing gas while the metal is in a state of oxidized metal. Nickel is particularly preferable in terms of its oxidation-reduction characteristics, heat resistance, and corrosion resistance, for example.

Ceramic may be contained in the foamed material in addition to the metal, for example. In order to not damage required characteristics (heat resistance, flexibility, water-absorbing property, durability, and the like), it is preferable that the content of ceramic be limited to 30% or less in terms of volume. Basically, a foamed material made only of metal, specifically, foamed metal is preferable. Thus, the most preferable foamed member is a foamed material made only of nickel, specifically, foamed nickel.

The foamed nickel is manufactured as follows. A foamed urethane sheet with through holes is plated with electroless nickel to be given conductivity. Then, the urethane sheet is plated with electrolytic nickel. The urethane sheet is heated in an oxidizing atmosphere thereafter and then continues to be heated in a reducing atmosphere such as ammonia decomposition gas. Urethane is burned by the heating in a series of these stages. Nickel becomes oxidized nickel while internal nickel is left as a result of the first-stage heating in the oxidizing atmosphere. The presence of the internal nickel maintains a foamed shape. The oxidized nickel returns to nickel as a result of the second-stage heating in the reducing atmosphere, thereby forming complete foamed nickel.

The evaporator of this invention is suitably used for generation of steam for reforming to generate hydrogen-rich reducing gas to be supplied as fuel gas to a fuel electrode of a solid electrolyte fuel cell. In this case, an external heat source for the heating chamber in the evaporator of this invention is preferably exhaust heat released in response to running of the solid electrolyte fuel cell, more specifically, radiant heat from a cell stack, exhaust gas released from the cell stack, specifically, heat of combustion of unused gas called off-gas, or a combination of these heats, for example.

A fuel cell system of this invention uses the evaporator of this invention for generation of steam for reforming to generate hydrogen-rich reducing gas to be supplied as fuel gas to a fuel electrode of a solid electrolyte fuel cell. The solid electrolyte fuel cell includes a solid oxide fuel cell and a solid polymer fuel cell. This invention is suitable for the solid oxide fuel cell to operate at a high temperature. This is for the reason that the temperature of the evaporator is increased with increase in the operation temperature, so that the Leidenfrost phenomenon occurs more easily.

Using the capillary action of a porous body made of foamed metal represented by foamed nickel for facilitating flow of liquid is well known in the field of heat pipes. Specifically, in the field of heat pipes, sleeve-like foamed nickel is sealed as a wick near a pipe inner surface in such a manner as to contact the inner surface. Gas of a heating medium, resulting from evaporation of liquid of the heating medium at a heat inlet side end portion of the heat pipe, flows through internal space of the wick toward an opposite heat outlet side end portion of the heat pipe. The gas is condensed at the heat outlet side end portion and resultant liquid of the heating medium flows in the wick in the opposite direction toward the heat inlet side end portion.

As seen from the above, the wick made of the sleeve-like foamed nickel facilitates transfer of the liquid by means of capillary action. However, the liquid is transferred in the direction of the center line of the pipe while the gas flows in the opposite direction inside the wick. By contrast, according to the sleeve-like foamed nickel or foamed metal in the evaporator of this invention, water supplied to the internal space of the sleeve is diffused radially externally while the water is transferred in the direction of the center line of the internal space. The sleeve-like foamed nickel or foamed metal in the evaporator of this invention differs from the wick in the heat pipe in terms of a direction in which liquid flows in sleeve-like foamed metal, and in terms of a liquid state and a gaseous state completely, so that it functions in a completely different way from the wick in the heat pipe.

Advantageous Effects of Invention

In the evaporator of this invention, the foamed member containing metal as a principal component is disposed near the heating surface inside the heating chamber to be heated from the outside in such a manner as to contact the heating surface. Thus, the foamed member is heated efficiently by the heating surface. Further, water supplied along the heating surface in the heating chamber does not contact the heating surface directly. Before the water reaches the heating surface, the water permeates the porous body to substantially finish evaporation of the water. Thus, even if the temperature of the heating surface is in a high-temperature region to be subjected to the influence of the Leidenfrost phenomenon, there is no risk that the Leidenfrost phenomenon will occur. As a result, the heating chamber can be heated strongly from the outside while high steam generation efficiency can be maintained. The foamed member is also used effectively for suppressing pressure change (pulsation) resulting from evaporation of the water.

Thus, by being used for generation of steam for reforming to generate hydrogen-rich reducing gas to be supplied as fuel gas to a fuel electrode of a solid electrolyte fuel cell, for example, the evaporator of this invention is available for highly-efficient and stable generation of high-temperature steam for reforming. As a result, the evaporator of this invention contributes to an increase in steam reforming efficiency that leads to an increase in power generation efficiency while maintaining favorable start-up characteristics at the start of running The fuel cell system of this invention uses the evaporator of this invention for generation of steam for reforming to generate hydrogen-rich reducing gas to be supplied as fuel gas to a fuel electrode of a solid electrolyte fuel cell. As a result, the fuel cell system of this invention contributes to an increase in steam reforming efficiency that leads to an increase in power generation efficiency while maintaining favorable start-up characteristics at the start of running

EMBODIMENT FOR CARRYING OUT INVENTION

Figure 1:
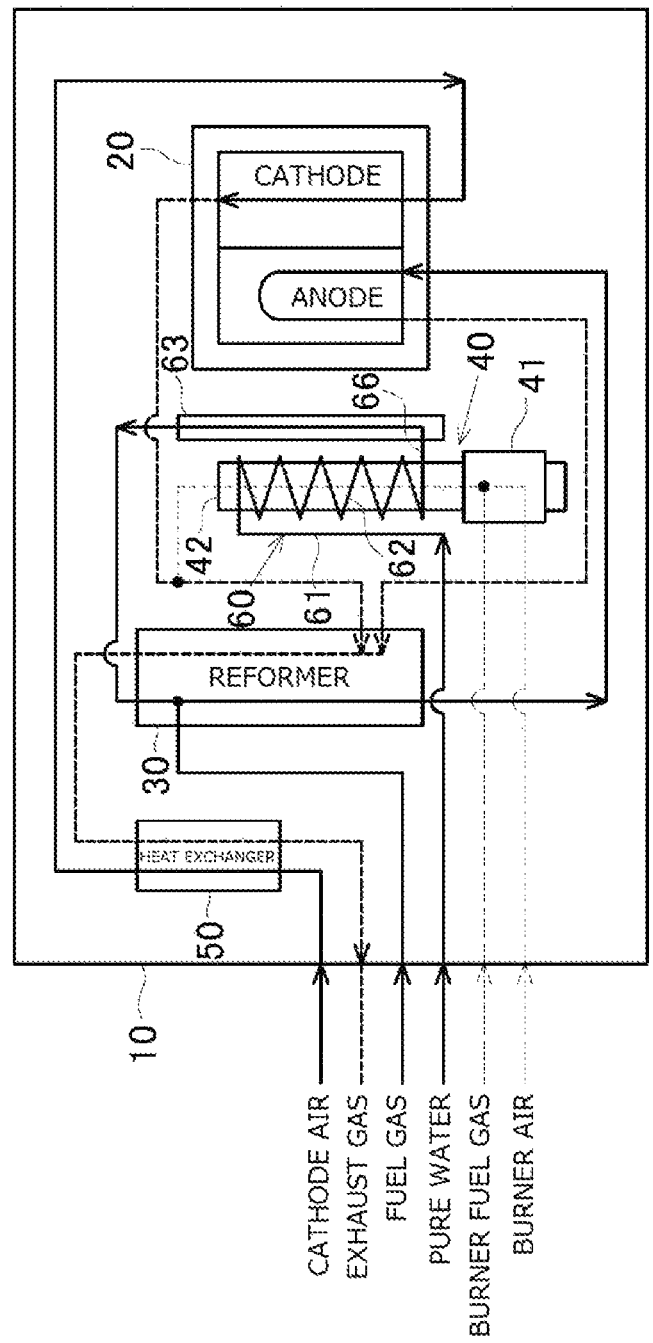
FIG. 1 is a conceptual view of a fuel cell system showing an embodiment of this invention.

An embodiment of this invention is described below by referring to the drawings.

As shown in FIG. 1, a fuel cell system according to the embodiment is formed by housing various units including a cell stack 20 in a heat-insulated casing 10. The cell stack 20 as a power generator is formed by interleaving cells like flat plates each considered as one minimum constituting unit of a solid-oxide fuel cell together with current collectors, stacking plate-like interconnectors (separators) in a thickness direction, and holding a resultant stack while applying pressure in the direction of the stack.

Each cell is formed as a circular or rectangular flat plate with a three-layered structure including a flat solid electrolyte layer made of yttria-stabilized zirconia, a flat fuel electrode stacked on one surface side of the solid electrolyte layer and made of a cermet of Ni and YSZ, and a thin flat air electrode stacked on an opposite surface side of the solid electrolyte layer and made of lanthanum strontium manganite (LSM).

The units disposed in the casing 10 except the cell stack 20 include a reformer 30, a burner-type preheater 40, a heat exchanger 50, an evaporator 60, etc. To generate fuel gas to be supplied toward the fuel electrode of the cell stack 20, the reformer 30 reforms hydrocarbon-based raw fuel gas such as city gas containing methane (CH4) as a principal component to hydrogen-rich reducing gas using steam. The burner-type preheater 40 preheats the units inside the casing 10, particularly the cell stack 20 and the reformer 30 at the start of running. The heat exchanger 50 preheats air to be supplied toward the air electrode of the cell stack 20. The evaporator 60 generates steam for the reforming at the reformer 30.

The reformer 30 includes a combustion part and a catalyst part. The combustion part is for combustion of unreacted fuel gas (combustion off-gas) generated on a fuel electrode side of the cell stack 20 and unreacted air (air off-gas) generated on an air electrode side of the cell stack 20. The catalyst part is loaded with a catalyst required for steam reforming that is heated with high-temperature combustion exhaust gas generated at the combustion part.

The burner-type preheater 40 includes a burner 41 and a radiant tube 42. The burner 41 burns fuel gas supplied from outside the casing 10 by air also supplied from outside the casing 10. The radiant tube 42 is disposed above the burner 41 and coupled to the burner 41. The radiant tube 42 is formed of a metal tube arranged in a vertical standing posture. The radiant tube 42 is disposed adjacent to both the cell stack 20 and the reformer 30. The radiant tube 42 lets high-temperature combustion exhaust gas generated at the burner 41 pass through to be heated to a high temperature from inside. After passing through the radiant tube 42, the combustion exhaust gas combines with air off-gas from the cell stack 20 and is introduced into the reformer 30.

The heat exchanger 50 preheats air to be supplied toward the air electrode of the cell stack 20 by heat exchange with combustion exhaust gas released from the reformer 30.

The evaporator 60 includes a linear pipe part 61, a spiral pipe part 62, and a cylindrical pipe part 63 as principal components. The linear pipe part 61 is arranged in a vertical posture and extends linearly in a bottom-to-top direction from an upstream side in terms of supply of water. The spiral pipe part 62 is arranged in a vertical posture and connected to the linear pipe part 61 so as to be adjacent to a downstream side of the linear pipe part 61. The spiral pipe part 62 extends in a spiral form in a top-to-bottom direction. The cylindrical pipe part 63 is arranged in a vertical posture and connected to the spiral pipe part 62 so as to be adjacent to a downstream side of the spiral pipe part 62. The cylindrical pipe part 63 extends linearly in a bottom-to-top direction.

The linear pipe part 61 corresponds to a piping starting part and forms a steam generator together with the spiral pipe part 62 downstream of the linear pipe part 61. The spiral pipe part 62 forms a principal part of the steam generator. To increase heating efficiency, the spiral pipe part 62 is disposed on an outer surface side of the radiant tube 42 of the burner-type preheater 40 to be concentric with the radiant tube 42. Thus, the spiral pipe part 62 is heated from the outside and from the inside with the cell stack 20 and the reformer 30 outside the spiral pipe part 62 and with the radiant tube 42 inside the spiral pipe part 62.

The cylindrical pipe part 63 forms a buffer tank that temporarily stores steam generated at the linear pipe part 61 and the spiral pipe part 62. The cylindrical pipe part 63 is formed of a cylindrical pipe body larger in diameter than a pipe body forming the linear pipe part 61 and the spiral pipe part 62. The cylindrical pipe part 63 has an inlet for steam at a lower end portion thereof and an outlet for the steam at an upper end portion thereof. The steam exiting the cylindrical pipe part 63 through the outlet is introduced into the reformer 30 and mixed with hydrocarbon-based raw fuel gas also introduced into the reformer 30.

Figure 2:
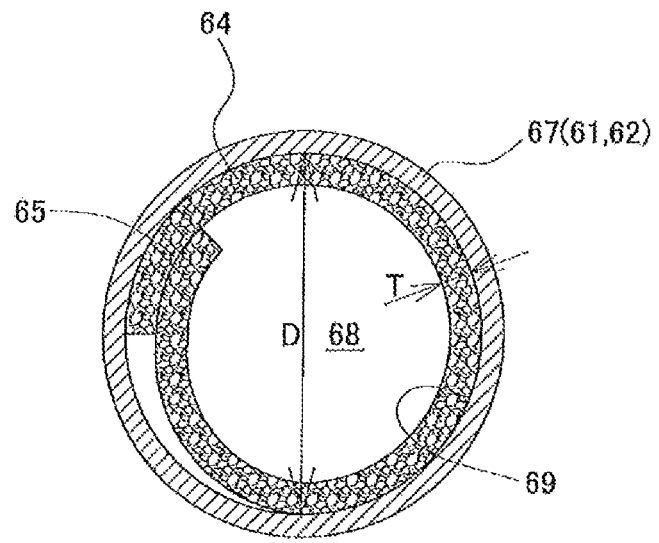
FIG. 2 is a cross sectional view of a pipe body showing a principal structure of an evaporator used in the fuel cell system.

As shown in FIG. 2, in the linear pipe part 61 and the spiral pipe part 62 forming the steam generator, a heating chamber 68 is formed inside a pipe body 67 forming these pipe parts. The inner surface of the pipe body 67 functions as a heating surface 69. A sleeve-like sheet made of foamed nickel as a foamed member 64 containing metal as a principal component is inserted into a place near the inner surface, specifically, an outer peripheral portion in the pipe body 67 in such a manner as to extend along the lengths of the linear pipe part 61 and the spiral pipe part 62 entirely. The sleeve-like sheet as the foamed member 64 mentioned herein is formed by rounding a flat foamed nickel sheet. Using spring back force generated by this rounding, the outer peripheral surface of the sheet contacts the inner surface of the pipe part. Opposite end portions of the sleeve-like sheet in a peripheral direction of the pipe form an overlapping part 65 having a given overlap. The overlapping part 65 extends linearly along the center line of the pipe body 67 forming the linear pipe part 61 and the spiral pipe part 62.

The steam generator formed of the linear pipe part 61 and the spiral pipe part 62 is manufactured by rounding a flat foamed nickel sheet, press-fitting the rounded nickel sheet with an air gun into the linear pipe body 67 having a long length such as 3 m, for example, specifically, into a straight pipe, in such a manner that the nickel sheet extends along the entire length of the straight pipe, then forming the straight pipe into the shapes of the linear pipe part 61 and the spiral pipe part 62.

In the steam generator, not only the material of the foamed member 64 but also its thickness, specifically, the occupancy thereof in the heating chamber 68 is an important issue. Referring to the foamed member 64 shown in FIG. 2, specifically, the sleeve-like sheet made of foamed nickel, if a sheet thickness T is too small relative to an inner diameter D of the pipe body 67, space inside the sleeve-like sheet becomes excessively large and the sheet thickness T becomes excessively small. This causes a risk of water having permeated the sleeve-like sheet passing through the sheet in its thickness direction to reach the heating surface 69 of the heating chamber 68. Conversely, if the sheet thickness T is too large relative to the inner diameter D of the pipe body 67, the space inside the sleeve-like sheet becomes excessively small and the sheet thickness T becomes excessively large. This disturbs flow of water inside the sleeve-like sheet. In view of these circumstances, the sheet thickness T is preferably from 0.02 to 0.2 times, particularly preferably from 0.05 to 0.15 times the inner diameter D of the pipe body 67.

The sheet thickness T of the sleeve-like sheet selected herein is 1 mm relative to the outer diameter (12 mm) and the thickness (1 mm) of the pipe body 67 forming the steam generator. Specifically, the sheet thickness T is 0.1 times the inner diameter D of the pipe body 67.

A horizontal connection pipe part 66 between the spiral pipe part 62 and the cylindrical pipe part 63 disposed downstream of the steam generator is loaded with ceramic beads, here, alumina beads to form an orifice.

A method of running the fuel cell system and the operation and function of the fuel cell system according to this embodiment are described next.

At the start of running the fuel cell system, fuel gas and air for a burner are supplied to the burner 41 of the burner-type preheater 40 to start combustion at the burner 41. High-temperature combustion exhaust gas resulting from the combustion flows into the radiant tube 42 above the burner 41 to preheat the radiant tube 42. By heating the radiant tube 42, the cell stack 20 and the reformer 30 disposed adjacent to the radiant tube 42 are heated by radiant heat from the radiant tube 42. The linear pipe part 61, the spiral pipe part 62, and the cylindrical pipe part 63 of the evaporator 60 disposed in the close vicinity of the radiant tube 42 are also preheated by the radiant heat from the radiant tube 42.

When the evaporator 60 and the reformer 30 reach their respective operable temperatures, supply of pure water to the evaporator 60 is started to make the evaporator 60 start to generate high-temperature steam. Further, supply of hydrocarbon-based raw fuel gas such as city gas containing methane ($CH_4$) as a principal component to the reformer 30 is started. In the reformer 30, the hydrocarbon-based raw fuel gas supplied from outside is mixed with the high-temperature steam supplied from the evaporator 60 and passes through the catalyst part to become hydrogen-rich reducing gas. This reducing gas is supplied toward the fuel electrode of the cell stack 20, thereby preventing oxidation of the fuel electrode side. At the same time, air is supplied through the heat exchanger 50 toward the air electrode of the cell stack 20.

The hydrogen-rich reducing gas having passed through the fuel electrode side of the cell stack 20 is introduced into the combustion part of the reformer 30. At the same time, the air having passed through the air electrode side of the cell stack 20 is introduced into the combustion part of the reformer 30 together with the high-temperature combustion exhaust gas released from the burner-type preheater 40. This causes combustion of mixed gas of the reducing gas and the air at the combustion part of the reformer 30 without an ignitor. High-temperature combustion exhaust gas resulting from the combustion facilitates preheating of the catalyst part of the reformer 30. This combustion exhaust gas further passes through the heat exchanger 50 to preheat air to be supplied toward the air electrode of the cell stack 20.

During power generation, unused fuel gas (combustion off-gas) is released from a fuel electrode side of the cell stack 20. Further, unused air (air off-gas) is released from an air electrode side of the cell stack 20. These off-gases are high-temperature gases. In response to supply of these gases to the combustion part of the reformer 30, combustion continues at the combustion part of the reformer 30 to heat the catalyst part continuously. As a result, steam reforming continues at the reformer 30. Further, preheating of air continues at the heat exchanger 50.

The evaporator 60 is heated with radiant heat from the cell stack 20 and the reformer 30, thereby generating steam continuously and supplying the generated steam to the reformer 30.

Next, a mechanism of steam generation by the evaporator 60 will be described in detail. Pure water supplied to the evaporator 60 passes through the linear pipe part 61 and is then supplied into the spiral pipe part 62. The sleeve-like sheet made of foamed nickel as the foamed member 64 containing metal as a principal component is inserted into the outer peripheral portion inside the pipe body 67 forming the linear pipe part 61 and the spiral pipe part 62 in such a manner as to contact the inner surface of the pipe body 67 as the heating surface 69. Thus, the pure water supplied to the pipe body 67 flows through the internal space of the sleeve-like sheet. During this flow, the pure water permeates the sleeve-like sheet.

The pipe body 67 forming the linear pipe part 61 and the spiral pipe part 62 is heated to a high temperature with radiant heat from the radiant tube 42 of the burner-type preheater 40 during preheating and with radiant heat from the cell stack 20 during power generation. The inner surface of the pipe body 67 as the heating surface 69 is also placed at a high temperature. Thus, the sleeve-like sheet is also heated strongly from an outer surface side thereof. As a result, the pure water having permeated the sleeve-like sheet is evaporated while being diffused externally. The evaporation is nearly finished before the pure water reaches the inner surface as the heating surface 69.

Thus, even if the temperature of the inner surface as the heating surface 69 is in a high-temperature region to be subjected to the influence of the Leidenfrost phenomenon, this influence is reduced effectively. As a result, high steam generation efficiency is maintained.

The evaporation of the pure water supplied to the evaporator 60 starts in the linear pipe part 61 and completes in some place in the spiral pipe part 62 that has a long flow path length and a large heat receiving area, at the latest.

The steam generated in the aforementioned manner passes through the orifice part in the connection pipe part 66 loaded with alumina beads and is then stored temporarily in the cylindrical pipe part 63 as the buffer tank. The generated steam is heated further and then supplied to the reformer 30. The linear pipe part 61 and the spiral pipe part 62 are expanded in volume rapidly by the evaporation of the pure water therein. However, pressure change to be caused by this expansion is suppressed effectively by the orifice part and the buffer tank, thereby moderating influence on the reformer 30.

As understood from the above, during preheating at the start of running and during power generation after the preheating, the evaporator 60 generates steam highly efficiently without being influenced by the Leidenfrost phenomenon.

Further, at the start of running, the evaporator 60 is heated mainly with radiant heat from the burner-type preheater 40 strongly and directly. As a result, the pipe body 67 forming the linear pipe part 61 and the spiral pipe part 62 as the steam generator in the evaporator 60, the heating chamber 68 inside the pipe body 67, and the inner surface of the pipe body 67 as the heating surface 69 are heated to high temperatures in a short time. This prevents an adverse effect on start-up characteristics at the start of running while influence by the Leidenfrost phenomenon is avoided.

As a result, a benefit of the effect of facilitating preheating by the burner-type preheater 40 can be received to the full extent while favorable start-up characteristics are obtained at the start of running.

Figure 3:
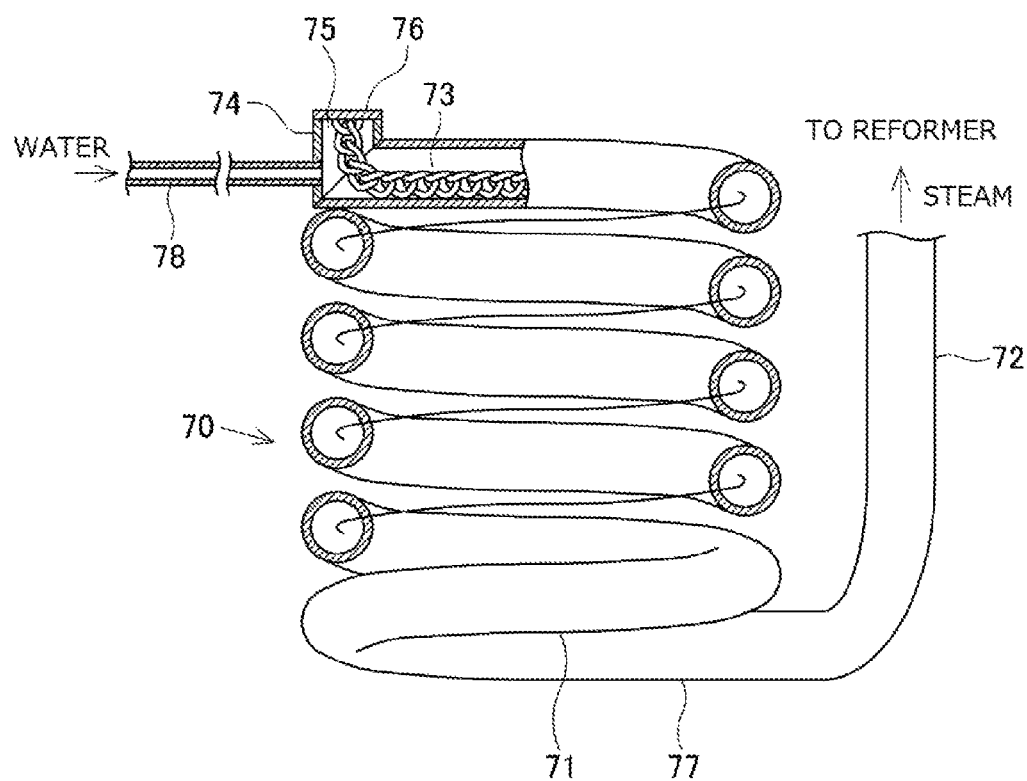
FIG. 3 is a longitudinal sectional view showing an example of a different configuration of the evaporator.

Like the evaporator 60 of the aforementioned embodiment, an evaporator 70 shown in FIG. 3 is used for generation of steam for reforming in a fuel cell. The evaporator 70 includes a spiral pipe part 71 and a linear pipe part 72 as principal components. The spiral pipe part 71 is arranged in a vertical posture and extends in a spiral form in a top-to-bottom direction from an upstream side toward a downstream side. The linear pipe part 72 is arranged in a vertical posture, disposed adjacent to the spiral pipe part 71, and connected to the downstream side of the spiral pipe part 71. The linear pipe part 72 extends linearly in a bottom-to-top direction from an upstream side toward a downstream side.

The spiral pipe part 71 is connected to the linear pipe part 72 downstream of the spiral pipe part 71 through a horizontal pipe part 77. The spiral pipe part 71 and these pipe parts form a steam generator together. Like the spiral pipe part 62 of the evaporator 60 of the aforementioned embodiment, the spiral pipe part 71 forming a principal part of the steam generator is disposed on an outer surface side of the radiant tube 42 of the burner-type preheater 40 to be concentric with the radiant tube 42. Thus, the spiral pipe part 71 is heated from the outside and from the inside with the cell stack 20 and the reformer 30 outside the spiral pipe part 71 and with the radiant tube 42 inside the spiral pipe part 71 (see FIG. 1).

Figure 4:
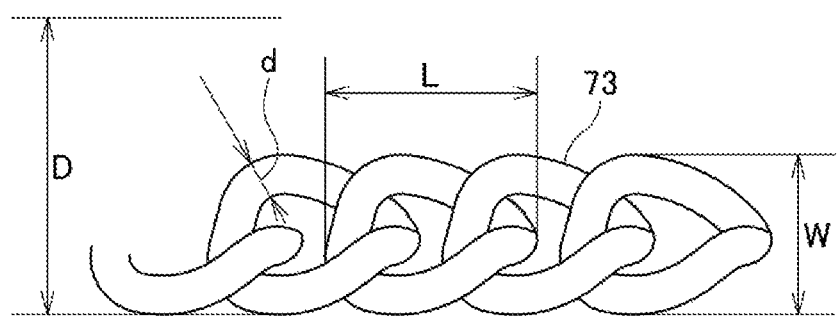
FIG. 4 explains the shape of a heat-resistant chain used in this configuration.
Figure 5:
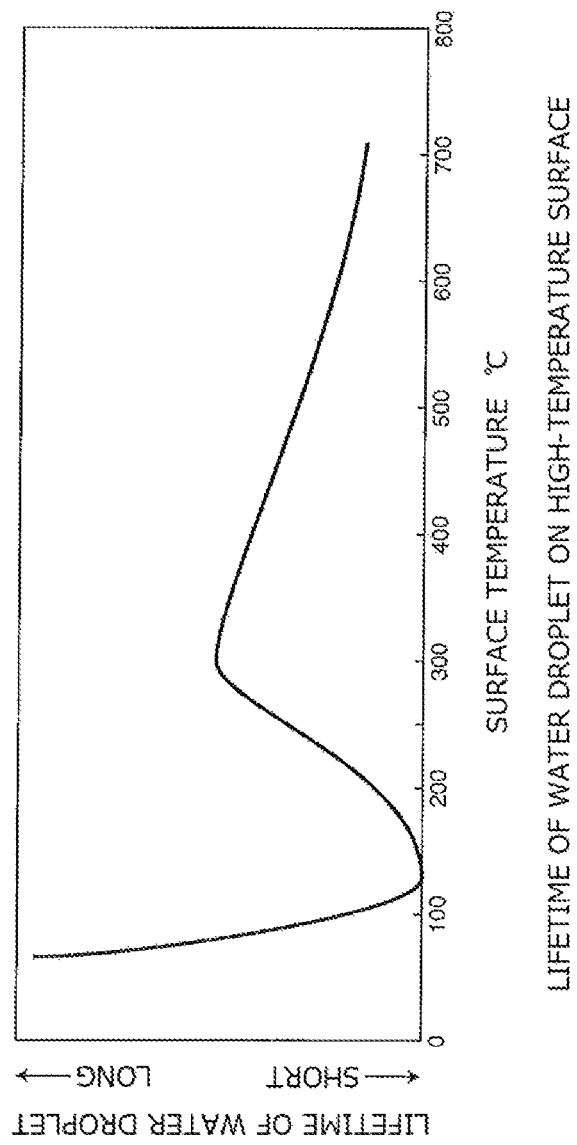
FIG. 5 is a graph showing the lifetime tendency of a water droplet on a heating surface.

A heat-resistant chain 73 is inserted into the spiral pipe part 71 and the horizontal pipe part 77 as a connection pipe part in such a manner as to extend from an upstream-side end portion of the spiral pipe part 71 toward a downstream-side end portion of the horizontal pipe part 77. As shown in FIG. 4, the heat-resistant chain 73 is one type of chain formed by linking rings continuously. The heat-resistant chain 73 is a twisted chain formed of twisted oval rings, so that the heat-resistant chain 73 is allowed to deflect in a wide range from the center line. In terms of material, the heat-resistant chain 73 is a metal chain made of SUS-based refractory metal. In the spiral pipe part 71, the heat-resistant chain 73 is placed on an inclined floor surface of an inclined pipe forming the spiral pipe part 71 and is disposed near the floor surface (here, in a lower half portion).

An upstream-side end surface, specifically, an upper opening end surface of the spiral pipe part 71 is closed by a short longitudinal pipe 74 joined to this end surface at substantially 90 degrees. A lower end surface of the longitudinal pipe 74 is closed by the upstream-side end portion of the spiral pipe part 71. Meanwhile, an upper end surface of the longitudinal pipe 74 is opened to form an opening part 75 for insertion of the heat-resistant chain 73 into the spiral pipe part 71. In this way, the upwardly-pointed opening part 75 crossing (here, perpendicular to) a direction of a fluid flow is provided at the upstream-side end portion of the spiral pipe part 71. A base portion (upstream-side end portion) of the heat-resistant chain 73 is connected by welding to a lid 76 closing the opening part 75. In this way, the heat-resistant chain 73 is held in the spiral pipe part 71. Reference sign 78 denotes a water supply pipe connected to the longitudinal pipe 74 for supply of water into the spiral pipe part 71. The water supply pipe 78 is pointed in a direction that is the same as the direction of fluid flow at the upstream-side end portion of the spiral pipe part 71.

Like in the linear pipe part 61 of the evaporator 60 of the aforementioned embodiment, a sleeve-like sheet made of foamed nickel, particularly a sleeve-like sheet formed by rounding a flat foamed nickel sheet, is inserted into the linear pipe part 72 in such a manner as to extend along the length of the linear pipe part 72 entirely. Using spring back force generated by this rounding of the foamed nickel sheet, the outer peripheral surface of the sheet contacts the inner surface of the pipe body.

Regarding the dimensions of the heat-resistant chain 73 inserted into the spiral pipe part 71, a maximum width of the heat-resistant chain 73 (a maximum width W of each ring) and a thickness d of a ring material are important. For insertion of the heat-resistant chain 73 into the pipe body forming the spiral pipe part 71, the maximum width of the heat-resistant chain 73 (the maximum width W of each ring) should be smaller than an inner diameter D of the pipe body. More strictly, this maximum width is preferably from 0.5 to 0.7 times the inner diameter D of the pipe body. If the maximum width of the heat-resistant chain 73 (the maximum width W of each ring) is too small, effect of generating a turbulent flow of water introduced into the spiral pipe part 71 is reduced. Conversely, if this maximum width is too large, the introduced water or steam is to flow with increased resistance. Further, a degree of freedom of deflection of the heat-resistant chain 73 is reduced in the pipe body, thereby causing a risk that the heat-resistant chain 73 cannot be inserted smoothly into the pipe body.

Regarding the thickness d of the ring material, a ratio of the thickness d to the maximum width W of the ring is an important issue. If the thickness d is too large, a degree of freedom of deflection of the heat-resistant chain 73 is reduced to make it difficult for the heat-resistant chain 73 to be inserted into the pipe body. Further, water or steam is to flow with increased resistance. Conversely, if the thickness d is too small, the flow resistance becomes excessively small to reduce the effect of generating a turbulent flow of water introduced into the spiral pipe part 71. In view of these circumstances, the thickness d of the ring material is preferably from 0.1 to 0.3 times in terms of a ratio to the maximum width W of the ring.

The evaporator 70 of the aforementioned structure is assembled as follows.

A straight pipe as a constituent material of the spiral pipe part 71, the horizontal pipe part 77, and the linear pipe part 72 is bent and the longitudinal pipe 74 is joined by welding, thereby completing the spiral pipe part 71, the horizontal pipe part 77, and the linear pipe part 72. The heat-resistant chain 73 is inserted into the spiral pipe part 71 and the horizontal pipe part 77 through the opening part 75 formed at the upstream-side end portion of the completed spiral pipe part 71. The heat-resistant chain 73 can deflect in all directions from the center line and produces low friction with the inner surface of the pipe body. Thus, the heat-resistant chain 73 is inserted into the pipe body smoothly along the inclined pipe body inner surface of the spiral pipe part 71 by using the weight of the heat-resistant chain 73 itself. After the heat-resistant chain 73 is inserted, the lid 76 attached to the base end of the heat-resistant chain 73 is welded in an airtight manner to the upper end of the longitudinal pipe 74. As a result, the opening part 75 is closed by the lid 76 and the heat-resistant chain 73 is held along the entire lengths of the spiral pipe part 71 and the horizontal pipe part 77.

Before the straight pipe is bent, the heat-resistant chain 73 may be first inserted into a place of the straight pipe that will become the spiral pipe part 71 and the horizontal pipe part 77. Then, the straight pipe may be bent. The heat-resistant chain 73 in the pipe body deflects with a high degree of freedom from the center line. Thus, the heat-resistant chain 73 is free from the risk of being deformed by the bending of the pipe body.

In parallel with the insertion of the heat-resistant chain 73 into the spiral pipe part 71 and the horizontal pipe part 77, a flat foamed nickel sheet is rounded and press-fitted with an air gun into the pipe body of the completed linear pipe part 72 from a downstream-side end portion (upper end portion) of the linear pipe part 72 in such a manner as to extend along the entire length of the linear pipe part 72. If it is difficult to press-fit the heat-resistant chain 73 after the bending, the flat foamed nickel sheet may be rounded and press-fitted with an air gun into a place of the straight pipe that will become the linear pipe part 72 before the straight pipe is bent. Then, the linear pipe part 72 may be formed by bending. Even if the rounded foamed nickel sheet is inserted before the bending, the pipe body in the linear pipe part 72 is not processed by the bending. This prevents deformation of the rounded foamed nickel sheet in the pipe body.

As understood from the above, the heat-resistant chain 73 is inserted into the pipe body ranging from the spiral pipe part 71 to the horizontal pipe part 77 of the evaporator 70 while the foamed nickel sheet is rounded and inserted into the pipe body forming the linear pipe part 72.

A mechanism of steam generation by the evaporator 70 is described next.

Pure water is supplied through the water supply pipe 78 to the evaporator 70. The supplied pure water travels from the spiral pipe part 71, passes through the horizontal pipe part 77, and is then supplied into the linear pipe part 72. Here, the evaporator 70 is heated to a high temperature with radiant heat from the radiant tube 42 of the burner-type preheater 40 during preheating and with radiant heat from the cell stack 20 during power generation. Further, the heat-resistant chain 73 is inserted into the spiral pipe part 71 in such a manner as to extend along the entire length of the spiral pipe part 71.

The pure water supplied to the spiral pipe part 71 collides with the heat-resistant chain 73 in the pipe body to generate a turbulent flow and to be scattered vigorously. Thus, the supplied pure water flows downstream while avoiding contact with the inner surface of the pipe body. Here, the pipe body forming the spiral pipe part 71 is an inclined pipe. This causes the pure water in the pipe body to flow near the inclined bottom surface. The heat-resistant chain 73 in the pipe body is placed on the inclined bottom surface and disposed near the bottom surface (here, in the lower half portion of the pipe body) to cover the bottom surface. As a result of these actions, the pure water in the pipe body collides with the heat-resistant chain 73 on the bottom surface efficiently to be scattered while avoiding contact with the inclined bottom surface of the pipe body. Thus, even if the temperature of the inner surface of the pipe body is heated to a high-temperature region where the Leidenfrost phenomenon occurs, evaporation proceeds efficiently while the Leidenfrost phenomenon is effectively avoided.

Steam generated in the spiral pipe part 71 travels from the spiral pipe part 71, passes through the horizontal pipe part 77, and is then fed into the linear pipe part 72. In the spiral pipe part 71, the steam mainly passes through an area near an inclined ceiling surface in the pipe body (here, the upper half portion of the pipe body). The heat-resistant chain 73 does not exist in this portion in the pipe body, so that the steam does not meet large flow resistance through this portion. This also contributes to high steam generation efficiency in the spiral pipe part 71 where the heat-resistant chain 73 is disposed.

The evaporation of the pure water supplied to the evaporator 70 starts in the upstream-side spiral pipe part 71 and completes in some place in the downstream-side horizontal pipe part 77 or linear pipe part 72, at the latest. If the evaporation is not completed in the horizontal pipe part 77, pure water remaining unevaporated flows from the horizontal pipe part 77 into the linear pipe part 72 with steam and evaporation of this pure water is finished in the linear pipe part 72.

Thus, even if the temperature of the inner surface of the pipe body in the connection pipe part 77 and the linear pipe part 72 is in a high-temperature region to be subjected to the influence of the Leidenfrost phenomenon, this influence is reduced effectively. As a result, high steam generation efficiency is maintained.

Like in the evaporator 60 of the aforementioned embodiment, the steam generated in the aforementioned way is used for steam reforming at the reformer 30 for fuel cells (see FIG. 1).

Like in the evaporator 60, during preheating at the start of running and during power generation after the preheating, steam is generated highly efficiently while influence by the Leidenfrost phenomenon is avoided. Further, favorable start-up characteristics are obtained at the start of running The sleeve-like sheet made of foamed nickel is inserted into the outer peripheral portion inside the pipe body forming the linear pipe part 72 in such a manner as to contact the inner surface of the pipe body. Thus, if evaporation is completed in the linear pipe part 72, pure water entering the linear pipe part 72 flows through the internal space of the sleeve-like sheet together with steam. During this flow, the pure water permeates the sleeve-like sheet. The pure water having permeated the sleeve-like sheet is evaporated while being diffused externally. The evaporation of this pure water is almost finished before the pure water reaches the inner surface of the pipe body.

If evaporation is to be completed in the horizontal pipe part 77, insertion of a foamed member containing metal as a principal component into the linear pipe part 72 can be omitted. In this case, only the heat-resistant chain 73 in the spiral pipe part 71 and the horizontal pipe part 77 is required as a material to suppress the Leidenfrost phenomenon in the pipe body of the evaporator 70. In this case, the linear pipe part 72 becomes a buffer tank comparable to the cylindrical pipe part 63 of the evaporator 60 of the aforementioned embodiment.

If evaporation is to be completed in the spiral pipe part 71, insertion of the heat-resistant chain 73 into the horizontal pipe part 77 can be omitted. Depending on the progress of evaporation in the spiral pipe part 71, the inserted heat-resistant chain 73 is not required to extend along the entire length of the spiral pipe part 71, and the extension of the inserted heat-resistant chain 73 can be limited from the upstream-side end portion to an intermediate portion of the spiral pipe part 71.

EXAMPLES

As examples of this invention, the superiority of foamed nickel (sleeve-like sheet) over different materials was examined in terms of being disposed near a pipe inner surface (heating surface) in a pipe body (heating chamber) to be heated from the outside in such a manner as to contact the pipe inner surface (heating surface) in an evaporator. The superiority of a heat-resistant chain (SUS-based twisted chain) over different materials was also examined in terms of being disposed in the pipe body (heating chamber). Examples of the different materials used herein include a foamed metal sheet made of SUS-based heat-resistant metal, metal mesh also made of SUS-based heat-resistant metal, expanded metal also made of SUS-based heat-resistant metal, and a fabric of alumina long fibers (alumina sleeve). Results of the examinations are shown in Table 1.

Regarding processability as one of the 13 examined items, a material was evaluated in terms of workability and material state while the material was inserted into a straight pipe having an outer diameter of 12 mm in such a manner as to extend 4 m, and the processability of the pipe after the insertion. A material was evaluated as being "excellent (⊚)" if it could be inserted as is without any processing thereon into the entire region of the pipe by press-fitting with an air gun and if it allowed bending of the pipe after the insertion. A material was evaluated as being "good (◯)" if it could be inserted into the entire region even if requiring rounding of the material for the insertion and if it allowed bending of the pipe after the insertion. A material was evaluated as being "acceptable (Δ)" if it could be inserted to some extent after being rounded but could only be inserted to a halfway point due to buckling, for example. A material was evaluated as being "unacceptable (x)" if it could not be rounded or did not allow insertion of the material itself for a different reason.

Regarding the tightness of contact with a pipe inner surface, a material was evaluated in terms of state of contact

TABLE 1

| Characteristic | Material | | | | | |
| --- | --- | --- | --- | --- | --- | --- |
| | Foamed nickel | Foamed metal (SUS-based heat-resistant material) | Metal mesh (SUS-based heat-resistant material) | Expanded metal (SUS-based heat-resistant material) | Metal chain (SUS-based heat-resistant material) | Alumina sleeve |
| Easiness of material acquisition (market availability) | ⊚ | ◯ | ◯ | Δ | ◯ | ⊚ |
| Processability (filling performance) | ◯ | ◯ | Δ | X | ⊚ | ⊚ |
| Tightness of contact with pipe inner surface | ⊚ | ⊚ | Δ | — | X | Δ |
| Water-absorbing property (capillary force) | ⊚ | ⊚ | Δ | X | X | ⊚ |
| Pressure pulsation suppressing effect (experimental result) | ⊚ | — | — | — | ◯ | ⊚ |
| Durability in steam atmosphere | ◯ | — | — | — | ⊚ | X |
| Reducing performance in reducing atmosphere | ⊚ | ◯ | ◯ | ◯ | ◯ | X |
| Performance of being fixed to pipe | ◯ | ◯ | ◯ | ◯ | Δ | X |
| Material strength | ◯ | ◯ | ⊚ | ⊚ | ⊚ | Δ |
| Heat resistance (up to 800° C.) | ◯ | ⊚ | ⊚ | ⊚ | ⊚ | ⊚ |
| Heat-transferring performance | ◯ | ◯ | ◯ | ◯ | Δ | X |
| Lightweight property | ◯ | ◯ | ◯ | Δ | X | ⊚ |
| Cost | ◯ | ◯ | ◯ | ◯ | ◯ | ◯ |
| Turbulence effect | X | X | Δ | ◯ | ⊚ | X |
| Capability to follow processing into spiral form | Δ | Δ | Δ | X | ⊚ | ◯ |
| Comprehensive evaluation in linear pipe | ⊚ | ◯ | Δ | Δ | Δ | X |
| Comprehensive evaluation in spiral pipe | Δ | Δ | Δ | Δ | ⊚ | X |

Items examined include the following 15 items: easiness of material acquisition (market availability), processability, tightness of contact with a pipe inner surface, water-absorbing property, pressure pulsation suppressing effect, durability in steam atmosphere, behavior in reducing atmosphere (reducing performance), performance of being fixed in a pipe, material strength, heat resistance, heat-transferring performance, lightweight property, cost, turbulence effect, and capability to follow processing into a spiral form. The materials were evaluated in terms of these items in the following four ranks: excellent (⊚), good (◯), acceptable (Δ), and unacceptable (x). Two ranks, excellent (⊚) and good (◯), were regarded as being in an allowable range.

with the pipe inner surface determined when the material was inserted into a straight pipe having an outer diameter of 12 mm, an inner diameter of 10 mm, and a length of 30 cm. A material was evaluated as being "excellent (⊚)" if it could contact the pipe inner surface entirely and stably using spring back and if it could ensure a large contact area resulting from the shape of the material. A material was evaluated as being "acceptable (Δ)" if it caused a partial gap resulting from a bend or curve in the material, if it could not ensure a large contact area resulting from the shape of the material, and if it caused the probability of the occurrence of an extensive gap resulting from contraction and shrinkage of the material. A material was evaluated as being "unacceptable (x)" if it caused an extensive and definite gap.

Regarding the water-absorbing property, a material was evaluated in terms of a degree of permeation of a water droplet dropped on the material through the material by the following four ranks: excellent (◉), good (○), acceptable (Δ), and unacceptable (x). A more closely grained material of a higher porosity achieved an increased degree of permeation of the water droplet through the material by means of capillary action.

Regarding the pressure pulsation suppressing effect, a sample was formed by actually inserting a material into an outer peripheral portion inside a pipe and disposing the sample in the pipe. The material was evaluated by conducting an experiment of supplying water to the sample and heating the sample. This experiment resulted in cases where a pressure pulsation reducing effect was recognized, by contrast to the absence of insertion of a material into a pipe. Among these cases, a material having achieved the pressure pulsation reducing effect remarkably was evaluated as being "excellent (◉)"; a material having achieved the pressure pulsation reducing effect but not remarkably was evaluated as being "good (○)"; and a material not confirmed to have achieved the effect by the experiment was deemed to be out of evaluation "-."

Regarding the durability in a steam atmosphere, a material was evaluated in terms of a degree of being altered by a chemical reaction produced by steam oxidation. A material with heat resistance and corrosion resistance was evaluated as being "excellent (◉)" if it could be increased in wire diameter so it was determined to be insusceptible to the influence of oxidation accordingly. Materials with heat resistance and corrosion resistance that could not be increased in wire diameter were determined to be in the risk of damage due to the influence of oxidation. These materials were subjected to an experiment of operating a sample continuously for 200 hours. A material was evaluated as being "good (○) if damage was not recognized in the experiment. A material was evaluated as being "unacceptable (x)" if clogging was recognized in the experiment due to the melting and subsequent re-coagulation of silica ($SiO_2$) in the material by steam oxidation. A material not having been confirmed to achieve its effect by the experiment was deemed to be out of evaluation "-."

Regarding the behavior in a reducing atmosphere (reducing performance), a material was evaluated in terms of reactivity with a reducing gas. A pipe body for steam generation is used in a fuel gas line of a fuel cell and so is subjected to the risk of being exposed to reducing gas such as hydrogen gas. This is the reason why influence of reducing gas should be examined A metal was evaluated as being "excellent (◉)" if it restored its original state as metal in a reducing atmosphere after being oxidized once. A metal was evaluated as being "good (○)" if it did not restore its original state as metal in a reducing atmosphere after being oxidized once and accumulated the influence of the oxidation, but achieved excellent resistance to the oxidation. A metal having been influenced adversely in a reducing atmosphere was evaluated as being "unacceptable (x)."

The performance of being fixed to a pipe body shows fixing strength of a material attached to the inside of the pipe. A material was evaluated as being "excellent (◉)" if it is free from the risk of shifting position that is caused by a fluid flowing inside the pipe while requiring no fixing means. A material was evaluated as being "good (○)" if it is released from the risk of shifting position that is caused by a fluid flowing inside the pipe by bending the pipe while requiring no fixing means. A material was evaluated as being "acceptable (Δ)" if it required positive fixing means that can be simple fixing means such as welding. A material was evaluated as being "unacceptable (x)" if it required complicated fixing means.

The turbulence effect shows a degree of generation of a turbulent flow of water supplied into a pipe using a material disposed in the pipe. A material was evaluated as being "excellent (◉)" if it is expected to generate a remarkable turbulent flow. A material was evaluated as being "good (○)" if it is expected to generate a turbulent flow of some extent. A material was evaluated as being "acceptable (Δ)" if it is expected to generate a turbulent flow even if the flow might be a limited flow. A material was evaluated as being "unacceptable (x)" if it is not expected to generate a turbulent flow.

The capability to follow processing into a spiral form shows the capability of a material inside a straight pipe to follow processing on the pipe into a spiral form after the material is inserted in the straight pipe. Evaluation was made as follows. A material was inserted into a straight pipe having an outer diameter of 12 mm, an inner diameter of 10 mm, and a length of 3 m. Then, the straight pipe was bent into a spiral pipe with a radius of 30 mm A degree of abnormal deformation of the material inside the pipe occurring during the bending was examined and evaluated by cutting the spiral pipe. Excluding chains, materials having a sheet-like form were rounded and then inserted into the straight pipe. A material inside the pipe was evaluated as being "excellent (◉)" if it was completely free from abnormal deformation. A material inside the pipe was evaluated as being "good (○)" if it was deformed slightly by buckling. A material inside the pipe was evaluated as being "acceptable (Δ)" if an overlapping part was unfolded in a small area of a part deformed by buckling. A material inside the pipe was evaluated as being "unacceptable (x)" if serious buckling leading to unfolding of an overlapping part occurred in many places.

A material was evaluated in terms of the remaining items by the following four ranks: excellent (◉), good (○), acceptable (Δ), and unacceptable (x).

Based on the examination results in terms of the 15 items, a material was evaluated comprehensively by the aforementioned four ranks in the case of a straight pipe and in the case of a spiral pipe. Regarding the dimensions of a chain inserted into a pipe, while the inner diameter D of the pipe was 10 mm, a length L, the maximum width W, and the thickness d of a ring were 8.5 mm, 5.7 mm, and 1.2 mm respectively.

As understood from Table 1, if the materials disposed near a pipe inner surface (heating surface) in a pipe body (heating chamber) to be heated from the outside in such a manner as to contact the pipe inner surface (heating surface) in an evaporator are foamed nickel and SUS-based foamed metal, these materials were evaluated as being "excellent (◉)" or "good (○)" in terms of the items except the turbulence effect and the capability to follow processing into a spiral form and were regarded as within the allowable range. These materials differ from the other materials decisively due to their excellence in tightness of contact with a pipe inner surface and water-absorbing properties. The poorness in the turbulence effect is compensated for by such excellence. The poorness in the capability to follow processing into a spiral form is compensated for by using a straight pipe or a spiral pipe with a large bend radius as a target of insertion.

Meanwhile, a chain is poor in terms of the tightness of contact with a pipe inner surface and water-absorbing property, resulting in poor evaporativity. This can be compensated for by the turbulence effect. Meanwhile, the comprehensive evaluation of the chain in the case of a straight pipe is not good. This is for the reason that in the case of a straight pipe, a chain in the pipe does not contact the inner surface of the pipe sufficiently to increase an exposed area of the surface. By contrast, in the case of a spiral pipe, a pipe body forming an evaporator becomes an inclined pipe to make a chain in the pipe contact a bottom surface inside the inclined pipe by gravity. Water in the inclined pipe passes through the pipe near the bottom surface while contacting the bottom surface. The presence of the chain in a lower half portion including the bottom surface facilitates generation of a turbulent flow of the water inside the pipe. In the case of a straight pipe, particularly a longitudinal pipe (vertical pipe), a chain inside the pipe is suspended inside the pipe and so does not contact the inner surface of the pipe. With the inner surface exposed entirely, the Leidenfrost phenomenon is only reduced to a small extent.

A fabric of alumina long fibers causes problems in terms of durability in a steam atmosphere and behavior in a reducing atmosphere. Regarding the former, silica (SiO2) in fibers used for making flexible alumina fibers is melted by steam oxidation and then coagulated again, thereby causing clogging of the pipe. Regarding the latter, this silica (SiO2) is reduced to Si in a reducing atmosphere and loses fibrous property.

Foamed nickel is more excellent than SUS-based foamed metal in terms of behavior in a reducing atmosphere. Nickel can restore its original metallic state in a reducing atmosphere after being oxidized once to become oxidized metal. These characteristics are also used for the manufacture of foamed nickel. SUS-based heat-resistant metal has excellent heat resistance but cannot be reduced to its original state as metal after becoming oxidized metal once. These are important characteristics in a fuel cell using hydrogen-rich reducing gas as fuel gas.

Regarding cost, there is no large difference between foamed nickel, SUS-based metal materials, and a fabric of alumina long fibers. Nickel itself is an expensive metal. However, the amount of nickel used in foamed nickel is small and foamed nickel is in large demand in the field of solar cells. The cost of foamed nickel is becoming lower as a result of volume production.

REFERENCE SIGNS LIST

10 Casing
20 Cell stack
30 Reformer
40 Burner-type preheater
41 Burner
42 Radiant tube
50 Heat exchanger
60 Evaporator
61 Linear pipe part
62 Spiral pipe part
63 Cylindrical pipe part
64 Foamed member (sleeve-like sheet made of foamed nickel)
65 Overlapping part
66 Connection pipe part
67 Pipe body
68 Heating chamber
69 Heating surface
70 Evaporator
71 Spiral pipe part
72 Linear pipe part
73 Heat-resistant chain
74 Longitudinal pipe
75 Opening part
76 Lid
77 Horizontal pipe part
78 Water supply pipe

The invention claimed is:

1. An evaporator comprising a heating chamber formed inside a pipe body and configured to evaporate water supplied along a heating surface inside the heating chamber by the heating chamber being heated at an outer surface of the the pipe body, wherein
   a heat-resistant chain is disposed in the pipe body,
   the pipe body includes a spiral pipe part formed in at least a part of the pipe body in a longitudinal direction of the pipe body, the spiral pipe part being arranged in a vertical posture and extending in a top-to-bottom direction, and
   the heat-resistant chain is disposed in the spiral pipe part.

2. The evaporator according to claim 1, wherein the heat-resistant chain is a twisted chain made of metal.

3. The evaporator according to claim 1, wherein a cylindrical pipe part larger in diameter than the pipe body is provided downstream of the spiral pipe part, the cylindrical pipe part being arranged in a vertical posture and extending in a bottom-to-top direction, the cylindrical pipe part having a lower portion connected to a lower end portion of the spiral pipe part corresponding to an outlet thereof and an upper portion with a steam outlet.

4. The evaporator according to claim 1, wherein
   an opening part is provided in an inlet area of the spiral pipe part, the opening part allowing entry into the pipe body from a direction crossing a flow direction, and
   a base end of the heat-resistant chain is attached to a lid closing the opening part.

5. The evaporator according to claim 4, wherein the opening part is positioned at an upper portion of the spiral pipe part in the peripheral direction of the pipe body.

6. The evaporator according to claim 1, wherein the pipe body includes a linear pipe part disposed upstream or downstream of the spiral pipe part, the linear pipe part being arranged in a vertical posture and extending in a bottom-to-top direction to be connected to an upstream end or a downstream end of the spiral pipe part.

7. The evaporator according to claim 6, wherein
   the heat-resistant chain is disposed in the spiral pipe part, and
   a foamed member containing metal as a principal component is disposed in the linear pipe part in such a manner as to contact an inner surface of the linear pipe part.

8. The evaporator according to claim 7, wherein the metal forming the principal component of the foamed member has oxidation-reduction characteristics of changing an oxidized state and restoring its original state as metal by being exposed to reducing gas.

9. The evaporator according to claim 8, wherein the metal is nickel.

10. The evaporator according to claim 9, wherein the foamed member is foamed nickel.

11. The evaporator according to claim 7, wherein the foamed member is a sleeve-like sheet disposed near the inner surface of the linear pipe part in such a manner as to contact the inner surface.

12. The evaporator according to claim 11, wherein the sleeve-like sheet contacts the inner surface of the linear pipe part using spring back force generated by rounding a flat sheet and press-fitting the rounded flat sheet into the linear pipe part.

13. The evaporator according to claim 12, wherein the sleeve-like sheet formed by rounding the flat sheet and inserting the rounded flat sheet into the linear pipe part includes an overlapping part where opposite end portions of the flat sheet in a peripheral direction of the pipe body overlap each other.

14. The evaporator according to claim 11, wherein the overlapping part is disposed parallel to a center line of the pipe body.

* * * * *